(12) United States Patent
Magens et al.

(10) Patent No.: US 10,597,271 B2
(45) Date of Patent: Mar. 24, 2020

(54) PROACTIVELY REDUCING VIBRATIONS IN AN INDUSTRIAL TRUCK

(71) Applicant: Jungheinrich Aktiengesellschaft, Hamburg (DE)

(72) Inventors: Ernst-Peter Magens, Ammersbek (DE); Jürgen Schmalzl, Haimhausen (DE); Hubert Bibernell, Landshut (DE); Carsten Schöttke, Moosburg (DE)

(73) Assignee: JUNGHEINRICH AKTIENGESELLSCHAFT, Hamburg (DE)

(*) Notice: Subject to any disclaimer, the term of this patent is extended or adjusted under 35 U.S.C. 154(b) by 186 days.

(21) Appl. No.: 15/791,726

(22) Filed: Oct. 24, 2017

(65) Prior Publication Data

US 2018/0111810 A1 Apr. 26, 2018

(30) Foreign Application Priority Data

Oct. 24, 2016 (DE) .................. 10 2016 220 810

(51) Int. Cl.
*B66F 9/00* (2006.01)
*B66F 9/075* (2006.01)
(Continued)

(52) U.S. Cl.
CPC .............. *B66F 9/075* (2013.01); *B66F 9/07* (2013.01); *B66F 9/0759* (2013.01);
(Continued)

(58) Field of Classification Search
USPC .......................................................... 701/50
See application file for complete search history.

(56) References Cited

U.S. PATENT DOCUMENTS

2011/0243699 A1* 10/2011 Kleeberger ......... B66F 9/07545
414/639
2014/0216853 A1 8/2014 Goncalves et al.
(Continued)

FOREIGN PATENT DOCUMENTS

EP 2368832 A1 9/2011
EP 3034455 A1 6/2016

OTHER PUBLICATIONS

European Patent Application No. EP17196386.1, Extended European Search Report dated Mar. 13, 2018, 10 pages.

*Primary Examiner* — James M McPherson
(74) *Attorney, Agent, or Firm* — Kilpatrick Townsend & Stockton LLP

(57) ABSTRACT

An industrial truck is described, such as a tri-lateral sideloader, comprising a truck body, wheels connected to the truck body by wheel suspensions, a mast, a plurality of operating components designed to carry out operating functions of the industrial truck, a control unit designed to actuate the operating components, and a detection apparatus designed to detect an operating parameter and/or a parameter of the environment. Here, the industrial truck further comprises a prediction unit designed to predict the occurrence of vibrations on the industrial truck based on data provided by the detection apparatus and to provide prediction data to the control unit. Based on the prediction data, the control unit is further designed to adapt the actuation of at least one of the operating components and/or to actuate an apparatus for reducing vibrations such that the vibrations predicted by the prediction unit are reduced.

12 Claims, 2 Drawing Sheets

Figure 1:
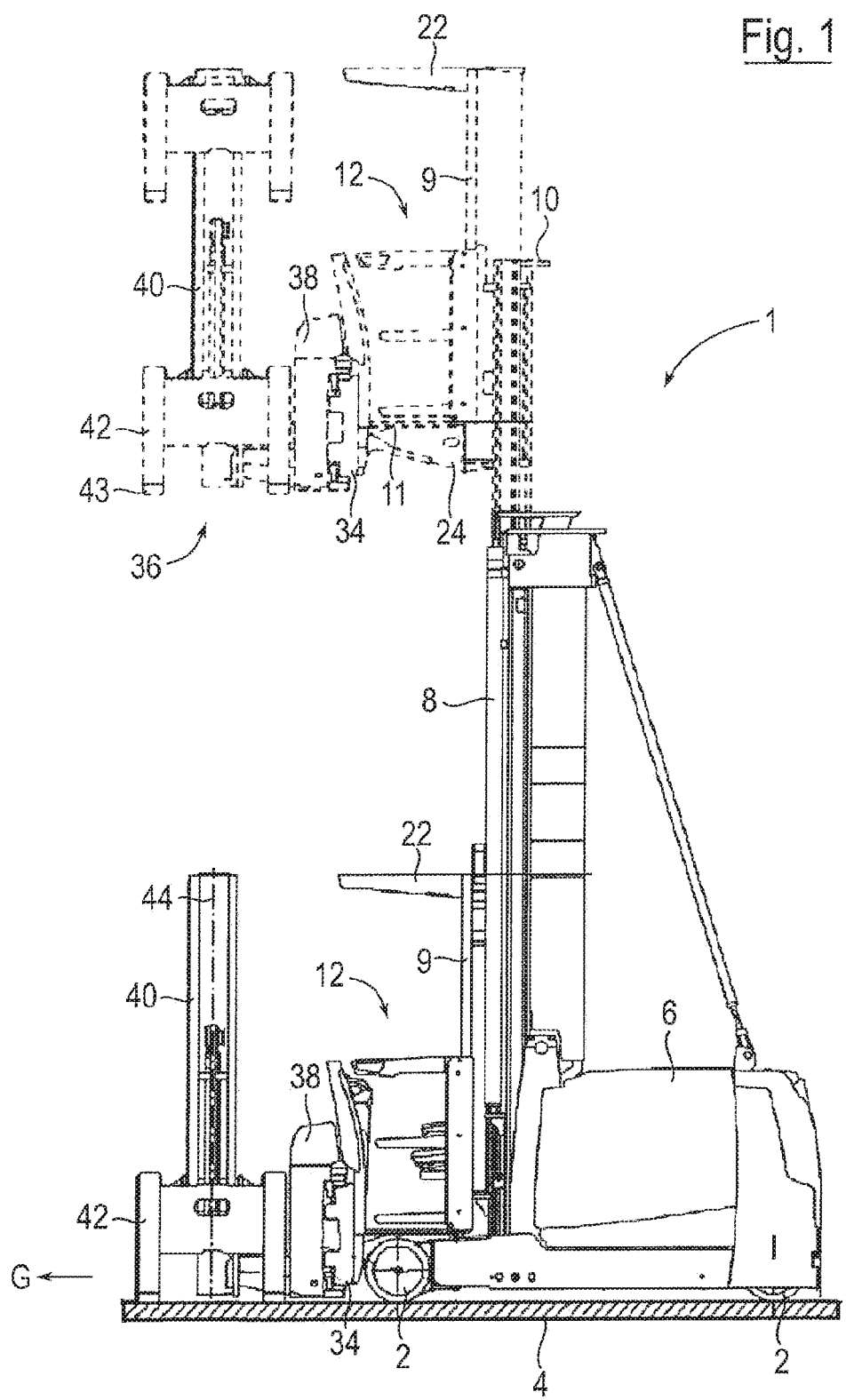

(51) Int. Cl.
*B66F 17/00* (2006.01)
*B66F 9/07* (2006.01)
*G05D 1/02* (2020.01)
*B66F 9/10* (2006.01)

(52) U.S. Cl.
CPC ........ *B66F 9/07559* (2013.01); *B66F 17/003* (2013.01); *G05D 1/0246* (2013.01); *G05D 1/0276* (2013.01); *B66F 9/10* (2013.01); *G05D 2201/0216* (2013.01)

(56) References Cited

U.S. PATENT DOCUMENTS

| | | |
|---|---|---|
| 2014/0277871 A1 | 9/2014 | Goncalves et al. |
| 2015/0291399 A1 | 10/2015 | Miki |
| 2015/0347840 A1* | 12/2015 | Iida .................... H04N 13/271 382/103 |
| 2016/0176692 A1 | 6/2016 | Sawodny et al. |

* cited by examiner

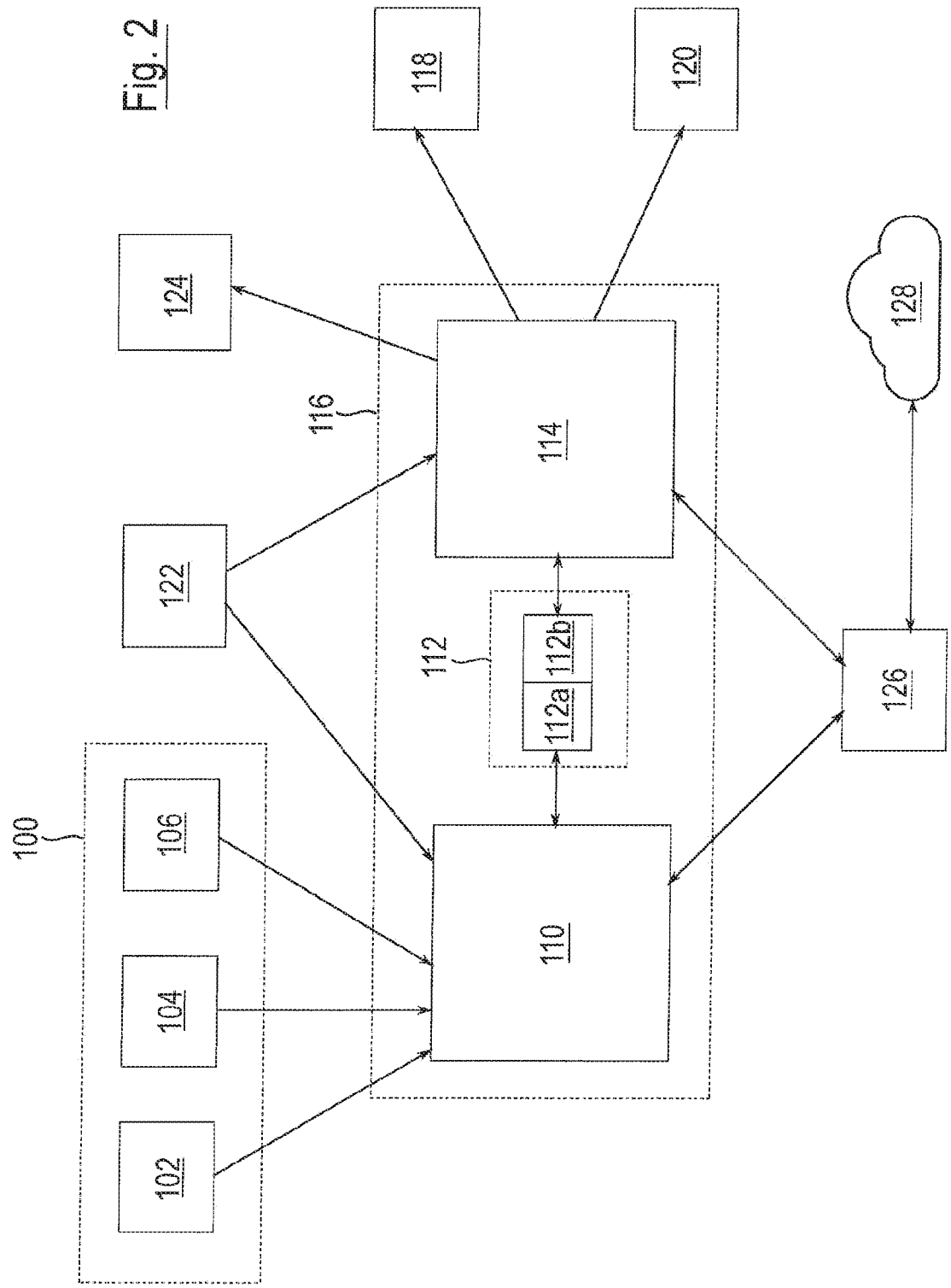

PROACTIVELY REDUCING VIBRATIONS IN AN INDUSTRIAL TRUCK

CROSS REFERENCE TO RELATED APPLICATION

This application claims priority to German Patent Application No. 10 2016 220 810.1, filed in Germany on Oct. 24, 2016, the entire contents of which are hereby incorporated herein by this reference.

BACKGROUND

An industrial truck, such as a tri-lateral sideloader, may be used for order picking of pallets or individual articles in a high-bay storage facility. In some cases, an industrial truck includes load-carrying fork arms for lateral push operations, the fork arms oriented or capable of being aligned transversely to the straight-ahead direction of travel of the industrial truck. Sideloaders of this kind designed as high-bay stacker trucks may allow combine stacking and unstacking of pallets and picking individual articles from the high bay. In some cases, a high-bay stacker truck includes a cab associated with a mast, which are movable upwards and downwards by means of a cab carrier. A high-bay stacker truck may also include a lateral push frame that is movable upwards and downwards on the mast together with the cab, such that the lateral push frame supports a load-carrying apparatus which is laterally movable back and forth, transversely to the straight-ahead direction of travel of the industrial truck. In some cases, an industrial truck having a cab that is moveable upwards and downwards on the mast is called a "man-up truck" or "man-up industrial truck."

It is a known problem that vibrations may occur on a mast of an industrial truck. In some cases, such vibrations may be more intense when a cab is raised higher on the mast. In addition, such vibrations may be more intense when a load is received by the load-carrying apparatus.

SUMMARY

According to certain embodiments, an industrial truck, such as a tri-lateral sideloader, includes a truck body, wheels connected to the truck body by wheel suspensions, and a mast that extends substantially vertically from the truck body. The mast is associated with a plurality of attachment parts. The industrial truck also includes a plurality of operating components, at least one control unit, and at least one detection apparatus. The operating components are designed to carry out operating functions of the industrial truck. The control unit is designed to actuate the operating components. The detection apparatus is designed to detect one or more of an operating parameter of the industrial truck or a parameter of the environment around the industrial truck.

In some embodiments, the industrial truck also includes a prediction unit that is operationally coupled to the detection apparatus and the control unit. The prediction unit is designed to predict an occurrence of vibrations on the industrial truck on the basis of data provided by the detection apparatus, the data representing one or more of the operating parameter or the parameter of the environment. The industrial truck is designed to provide prediction data to the control unit. The control unit is designed, on the basis of the prediction data, to actuate at least one of the operating components to reduce vibrations associated with the truck body or the mast, such that the predicted vibrations are reduced.

These illustrative embodiments are mentioned not to limit or define the disclosure, but to provide examples to aid understanding thereof. Additional embodiments are discussed in the Description, and further description is provided there.

The present invention relates to an industrial truck, in particular to a tri-lateral sideloader, comprising a truck body, wheels connected to the truck body by wheel suspensions, a mast, which extends substantially vertically from the truck body and with which a plurality of attachment parts are associated, a plurality of operating components, which are designed to carry out operating functions of the industrial truck, at least one control unit, which is designed to actuate the operating components of the industrial truck, and at least one detection apparatus, which is designed to detect at least one operating parameter of the industrial truck and/or at least one parameter of the environment around the industrial truck.

The present invention can be used particularly advantageously for sideloaders and high-bay stacker trucks, in particular tri-lateral sideloaders for order picking, in which load-carrying fork arms for lateral push operations are oriented or can be aligned transversely to the straight-ahead direction of travel of the industrial truck. Sideloaders of this kind designed as high-bay stacker trucks make it possible to combine stacking and unstacking of entire pallets and picking individual articles from the high bay without difficulty. High-bay stacker trucks of the type under consideration here include those in which a cab is associated with a mast so as to be movable upwards and downwards by means of a cab carrier, a lateral push frame being provided on the front of the cab, which lateral push frame is movable upwards and downwards on the mast together with the cab and supports a load-carrying apparatus which is laterally movable back and forth, transversely to the straight-ahead direction of travel of the industrial truck. Since the cab and an operator located thereon can be moved vertically on the mast together with the load-carrying apparatus, these types of industrial trucks are also called man-up trucks or man-up industrial trucks. In various designs of man-up industrial trucks, the mast can be telescopically extended and retracted, the cab being height-adjustably fastened to the telescoping stage of the mast that can be extended the highest.

The load-carrying apparatus that is movably guided in the lateral push frame can comprise an additional mast with load-receiving means that can move upwards and downwards thereon relative to the driver's platform, which load-receiving means are normally load-carrying arms or a load-carrying fork having such load-carrying arms. The additional mast is arranged on the lateral pusher in the manner of a pivoting pusher and can be pivoted thereon, about a typically vertical axis, by approximately 180° so that the load-carrying fork fastened to the additional mast in a height-adjustable manner can be pivoted out of a position in which it is oriented laterally, transversely to the straight-ahead direction of travel of the industrial truck, into a position in which it is oriented in an opposing lateral position. The lateral pusher is linearly guided on the lateral push frame.

However, it goes without saying that the present invention can also be advantageously used in industrial trucks having a simpler construction, such as conventional forklift trucks having a telescopic mast and a load-carrying means that is arranged on the mast in a non-pivotable manner, as is clear from the following considerations.

A typical task for the above-described tri-lateral sideloader for order picking consists, for example, in placing a pallet together with the load located thereon in a bay for storage, the industrial truck being in a narrow aisle between bays of a high-bay warehouse and the pallet being received on the load-carrying fork. The pallet is introduced laterally into the bay, transversely to the straight-ahead direction of travel of the industrial truck, it being assumed that the load-carrying fork is already correctly oriented towards the desired storage area so as to be laterally facing the bay, and the lateral pusher, together with the additional mast provided thereon, is in a lateral end position at the end of the lateral push frame that is remote from the bay in question. By means of the linear, lateral movement of the pivoting pusher along the lateral push frame, the loaded pallet can then be introduced into the bay.

A plurality of the above-mentioned operating components are provided for operating the various movable components on the mast. Depending on the features of the industrial truck, said operating components are used inter alia to move the load-receiving means on the additional mast, to pivot the additional mast about a vertical axis, to move the load-carrying apparatus and lateral pusher on the lateral push frame, to move the cab on the mast and optionally to telescopically extend and retract the mast. In industrial trucks, these are usually hydraulic operating components, but other drives, such as electric motors, should not be ruled out.

It is a known problem that, in the case of industrial trucks of the kind under consideration here, vibrations occur on the mast, in particular vibrations with horizontally lateral vibrating components, i.e. vibrating components directed transversely to the straight-ahead direction of travel of the industrial truck, in particular when travelling over an uneven surface. Such vibrations are often more intense the higher the cab and its devices, which are built on at the front, have been raised on the mast and the greater the load that is optionally received by means of the load-carrying apparatus, i.e. the position and the weight of the load can both have an impact on the amplitude and the frequency of the vibrations that occur.

Such vibrational movements make driving quickly into the narrow aisle and the placement of pallets into bays and their retrieval from bays difficult or even sometimes impossible such that the operator can only begin a placement or retrieval procedure safely when the vibrations have subsided once the industrial truck is stationary. Alternatively, when driving in regions in which the ground is uneven, the operator of the industrial truck could in principle drive at a reduced speed in order to largely prevent excitation of vibrations. Both of these would, however, reduce productivity when working with the industrial truck.

EP 2 368 832 B1 discloses an industrial truck, designed as a man-up truck, of the type mentioned at the outset, in which measures for reducing vibrations have already been taken. These measures consist in attaching an assembly, which is referred to as a load-receiving portion, can move up and down on the mast and comprises the cab, the support structure thereof and the load-support structure connected thereto, to the mast by means of a solid adapter plate, which is referred to as an auxiliary support and is directly height-adjustably fastened to the mast, such that said entire assembly can carry out movements relative to the adapter plate and thus to the mast that have a lateral, i.e. usually horizontal, movement component, and that are transverse to the straight-ahead direction of travel (main direction of travel) of the industrial truck, a separate degree of freedom of movement for the assembly that is not intended for the planned operation of the industrial truck being established in this case. The known industrial truck has means for damping or preventing vibrations in the relative position between the load-receiving portion and the mast, i.e. between the driver's platform (cab) and the adapter plate.

In this case, these means can be active, semi-active and/or passive vibration-damping means, which are suitable for generating a force or a torque between the adapter plate and the load-receiving portion, which force or torque has a component in the separate degree of freedom of movement that is not intended for the planned operation of the industrial truck. In EP 2 368 832 B1, damping elements and springs, inter alia, are proposed for reducing vibrations, which elements and springs counteract deflection of the mast and the assembly described as the load-receiving portion in the separate degree of freedom of movement. However, the solid adapter plate is a relatively heavy additional component which also has to be lifted in every lifting process as a kind of "dead weight", and also accordingly increases the total weight of the industrial truck.

In addition, EP 2 692 556 A2 discloses a method for operating an at least semi-active chassis of a truck, in which method an elevation profile of a route ahead of the truck is determined by means of a sensor unit and, on the basis of the determined elevation profile, at least one actuator unit associated with the chassis of the truck is proactively actuated by a control unit, for example by relieving the load on individual wheels which are expected to be driven through potholes. In this way, the introduction of vibrations into the truck is minimised from the outset. Anticipatory chassis of this type are, however, only suitable to a limited extent for use in industrial trucks, since said trucks are often not provided with chassis which reach the level of complexity of chassis of passenger cars or lorries, which are intended for driving on public highways.

The inventor of the present invention has recognised that the above-described principle of proactively preventing vibrations can be transferred to industrial trucks in an advantageous manner, meaning that the vibrations occurring in the industrial truck can be reliably and significantly reduced at a relatively low cost and with relatively low material complexity.

For this purpose, the industrial truck according to the invention further comprises a prediction unit, which is operationally coupled both to the detection apparatus and to the control unit and is designed to predict the occurrence of vibrations in an industrial truck on the basis of data provided by the detection apparatus which represent the at least one operating parameter of the industrial truck and/or at least one parameter of the environment around the industrial truck, and is designed to provide prediction data representing the predicted vibrations to the control unit. Here, the control unit is further designed to adapt, on the basis of the prediction data, the actuation of at least one of the operating components and/or to actuate at least one apparatus for reducing vibrations that is associated with the truck body or the mast such that the vibrations predicted by the prediction unit are reduced.

Since, as mentioned, the chassis in industrial trucks is only suitable to a limited extent, in comparison with passenger cars or lorries, for proactively responding to predicted vibrations, this task is undertaken in the industrial truck according to the invention either by operational components of the industrial truck that are provided anyway, or by devices for reducing vibrations that are specially provided for this purpose and are associated with the truck body or the mast. Adapting the actuation and thus the operation of at least one of the operating components, as carried out for this purpose, in this case includes not only adapting an operation of the operating component that is currently actually taking place, but also starting up the operating component for reducing vibrations if this component is currently not in operation.

This means that, for example, depending on the direction of the expected vibration, extension of the mast that is currently taking place could be decelerated or accelerated if it is predicted that vibration is about to occur, in order to counteract the development of the vibration, but also, for example, the boom could be pushed laterally when an upcoming vibration is predicted if this lateral pushing is currently not intended in the normal operation of the industrial truck, such that it is only used to prevent the occurrence of the vibration.

If apparatuses are provided on the industrial truck that are only used to reduce vibrations and do not have any function themselves in the normal operation of the industrial truck, these apparatuses are of course only actively brought into operation if a vibration is actually predicted. One example of this is a "split cab carrier", in which the mast and the load-receiving apparatus are decoupled in the region of the cab carrier, which decoupling can furthermore be actively actuated by means of actuators. Another example is a load support associated with the load-carrier assembly, which support for example can be directly associated with a load-carrying fork and can actively decouple the load relative to the fork arms. Furthermore, a rotating gyroscope associated with the truck body or the mast could also be conceivable that stabilises the corresponding component in space using its angular momentum and inertia, and the rotational speed thereof could be adapted on the basis of the prediction data.

It goes without saying that the prediction unit can be coupled to the control unit and that the individual components of the industrial truck according to the invention can be coupled to one another for the purpose of data exchange using transmission methods that are known to a person skilled in the art, for example in a wired manner or wirelessly, and in suitable data formats.

The detection apparatus of the industrial truck according to the invention may for example comprise at least one camera, which is preferably arranged and designed to detect the surface over which the wheels of the industrial truck will travel in the direction of travel of the industrial truck. Here, the prediction unit can carry out pattern recognition, which can identify any uneven areas or other obstacles in or on the surface beneath the truck, meaning that the vibrations that are likely to occur when driving over this area of the surface can be predicted.

Alternatively or in addition to the surface over which the truck drives, other parameters of the environment could also be detected by the at least one camera, such as obstacles in the elevation region of the mast of the industrial truck that would require the industrial truck to brake, with the acceleration generated by the braking also leading to vibrations, which can be counteracted if they are correctly actively predicted in the above-described manner.

It should also be noted that the at least one camera does not necessarily have to be formed by an optical camera, but that the term "camera", as used herein, can also include ultrasound cameras and thermal-imaging cameras and the like, and also more complex apparatuses such as stereo camera systems for recording three-dimensional images.

Additionally or alternatively, the detection apparatus may comprise at least one position-determination element. Using this position-determination element, the current position of the industrial truck and optionally its movement direction and movement speed can be detected, on the basis of which the prediction unit can identify positions and/or movement patterns of the industrial truck that would be likely to lead to vibrations occurring on the industrial truck, such as known positions of uneven areas in the surface beneath the truck. This embodiment is particularly relevant to narrow aisle trucks, since they generally only moved within a small and well-defined region of a bay warehouse which they drive around frequently.

If used outdoors, the position-determination element may for example draw on the global positioning system (GPS) or other external sources, whereas, if used in a warehouse or the like, transponders installed therein and/or other known apparatuses for position determination are provided, such as tracking of individual movement on the basis of recorded driving data.

Alternatively or additionally, the detection apparatus of the industrial truck may be designed to detect the weight and/or current position of a load supported by the industrial truck. It should be noted here that on one hand, by changing the current position of the actual load carried by the industrial truck, vibrations can be brought about, for example in the mast of the industrial truck, for example when the load is rapidly pivoted by means of the additional mast about a vertical axis, and that on the other hand, the position and/or the weight of the load is a significant input parameter for predicting vibrations that are likely to occur on the industrial truck, since, as already mentioned, in particular the amplitude and frequency of the vibrations that occur are highly correlated with the position and the weight of the load.

In a development of the present invention, the industrial truck according to the invention may further comprise an apparatus for detecting vibrations which is operationally coupled to the control unit and/or the prediction unit. By vibrations occurring on the industrial truck thus being predicted not only by means of the prediction unit, but also by detecting the actual occurrence of said vibrations, it is possible to evaluate and compare predicted and actually occurring vibrations, which allows for an adaptive system and thus for future predictions to be continually improved. The apparatus for detecting vibrations may for example be formed by at least one three-dimensional acceleration sensor which is arranged in a suitable position on the industrial truck and can provide information on both the amplitude and direction and also on the frequency of the vibrations occurring.

Inter alia, in order to allow for feedback of this type between predicted and actually occurring and detected vibrations on the industrial truck, at least one memory unit can be associated with the prediction unit, the control unit and/or the apparatus for detecting vibrations. By means of this memory unit, as already mentioned, historical data can be recorded and read out again; however, the at least one memory unit may also contain data for the prediction itself and provide said data as required, for example by construction parameters of the industrial truck, as well as other data required for predicting vibrations, such as parameters of physical models, being stored therein.

In one embodiment, at least one operating component, the actuation of which can be adapted by the control unit for reducing predicted vibrations, is formed by a component of the industrial truck which is associated with a driver's platform of the industrial truck or with a load-receiving apparatus of the industrial truck. Here, this may for example refer to the above-mentioned lateral pushers, load supports or split cab carriers, and generally speaking it may thus refer to all the attachment parts of the industrial truck that are provided between the cab carrier and the load.

In a possible embodiment of an industrial truck according to the invention, the prediction unit and the control unit may be formed by a single component, such as an on-board computer of the industrial truck, which optionally also assumes other functions in the industrial truck. This single component may potentially also assume at least some of the functions of the apparatus for detecting vibrations, for example processing data from a three-dimensional acceleration sensor. Furthermore, the at least one memory unit may likewise be provided as part of the single component, for example as a memory permanently associated with the on-board computer.

The industrial truck according to the invention may further comprise a communication unit, which is designed to receive parameters of the environment around the industrial truck from a central control device and/or to provide data to the central control device. In this case, this may for example be data regarding possible positions in a region in which the industrial truck will travel and in which the occurrence of excitation of vibrations is expected. Data of this type could be received by means of the communication unit at regular intervals and could be used by the prediction unit for the position-dependent prediction of vibrations. For this purpose, an electronic map of the region in which the truck will travel may for example be available to the prediction unit in a memory. Similarly, the communication unit could also be used to transmit the occurrence of vibrations to a central control device, in which the appropriate data are then processed and could be made available to other industrial trucks if necessary.

By thus integrating individual industrial trucks with a central control device, a kind of swarm intelligence can be established by directional data exchange, in which, for example, data gathered by one industrial truck regarding the surface over which it is driving can also be used by other industrial trucks. The central control device may for example be a superordinate logistics or warehouse system, with which the individual industrial trucks have a communication link anyway in order to receive orders and other information. Therefore, the function of the communication unit may also be assumed by a component that is provided on the industrial truck anyway.

In another aspect, the present invention relates to a method for reducing vibrations on an industrial truck, in particular a tri-lateral sideloader, which comprises a truck body, wheels connected to the truck body by wheel suspensions, a mast, which extends substantially vertically from the truck body and with which a plurality of attachment parts are associated, a plurality of operating components, which are designed to carry out operating functions of the industrial truck, at least one control unit, which is designed to actuate the operating components of the industrial truck, at least one detection apparatus and at least one prediction unit, which is operationally coupled both to the detection apparatus and to the control unit. This method comprises the steps of detecting at least one operating parameter of the industrial truck and/or at least one parameter of the environment around the industrial truck by means of the detection apparatus, of predicting vibrations in the industrial truck on the basis of data provided by the detection apparatus which represent the at least one operating parameter and/or at least one parameter of the environment around the industrial truck, by means of the prediction apparatus, of providing the prediction data generated in this way to the control unit, and of actuating at least one of the operating components and/or at least one apparatus for reducing vibrations that is associated with the truck body or the mast on the basis of the prediction data such that the vibrations predicted by the prediction unit are reduced.

In this method, predicting vibrations may include predicting an event with reference to a detected current position and/or a detected current movement state of the industrial truck. Here, the term "event" is understood to mean any kind of interaction of the industrial truck with its environment and/or any operating process of the industrial truck which results in a vibration being caused on the industrial truck. Examples of this include anticipated braking of the industrial truck at junctions ahead of it, the position of uneven areas in the travel surface in the movement direction of the industrial truck, and, associated therewith, the time at which the truck is likely to drive over any uneven areas and the like, with it being possible for the appropriate positions at which vibration-causing events are expected to be entered into a database and/or for said positions to be detected by the truck itself.

Furthermore, the method according to the invention may include a step of exploring the environment around the industrial truck, in which the industrial truck detects the occurrence of vibrations on the basis of its position, its movement state and/or other operating parameters. These may be dedicated training trips in which the industrial truck drives around the area that it is likely to cover in normal operation and detects vibrations that occur in order to make it possible to provide, on the basis of these measurements, predictions on vibrations that are then likely to occur when the truck travels over this area again.

Training trips of this type can be carried out repeatedly in order to obtain more robust results and to make it possible to record variations. It is not only possible to carry out training processes in dedicated training trips, however, but instead these processes can also be carried out during the actual operation of the industrial truck, and in this case a response to changing environmental conditions, such as any newly arising uneven areas in the travel surface, can also be provided in this way.

Other features and advantages of the present invention are clear from the following description of an industrial truck according to the invention when considered in conjunction with the accompanying drawings, in which:

FIG. 1 is a side view of an embodiment of an industrial truck designed as a tri-lateral high-bay stacker; and FIG. 2 is a schematic view of the components provided in the industrial truck from FIG. 1 for reducing vibrations.

FIG. 1 is a side view of an embodiment of an industrial truck 1 according to the invention, in particular a high-bay stacker which is designed as a tri-lateral sideloader. The industrial truck 1 is equipped with wheels 2 that are attached to wheel suspensions (not shown) and rest on the surface 4 beneath the truck. The wheel suspensions are in turn attached to a truck body 6, to which a vertically fastened mast 8 is also attached. The mast 8 is constructed of multiple parts so as to be telescopically extendable, as can be seen from FIG. 1 by the extended position indicated by dashed lines. At the furthest extendable telescopic stage 10 of the mast 8, a support structure 9 in the form of a cab carrier is attached such that it can move vertically. The support structure 9 has a cantilever arrangement 24 in the form of a boom, which projects forwards from the mast 8 in the main direction of travel G of the industrial truck and braces the underneath of a platform 11 of a cab 12 and supports a lateral push frame 34 at its projecting end.

The cab 12 is designed as a lifting driver's cabin, the frame of which comprises the cab platform 11 as the cabin floor, a back wall, side walls and a driver overhead guard 22. In the main direction of travel G, the lateral push frame 34 is fastened to the cantilever arrangement 24 in front of the cab 12. The lateral push frame 34 is part of a load-carrying assembly 36 known per se, which further comprises a lateral pusher 38 that is arranged on the lateral push frame 34 so as to move laterally transversely to the straight-ahead direction of travel G and is in the form of a pivoting pusher 38 comprising an additional mast 40 arranged on the front thereof, on which mast a load-carrying fork 42 comprising a fork carrier arrangement is vertically movable in the form of a load-carrying element. The additional mast 40 can be pivoted together with the load-carrying fork 42 about the vertical axis 44 between the position shown in FIG. 1, in which the load-carrying fork 42 and its load-carrying arms 43 are oriented laterally (transverse orientation to the left in relation to the straight-ahead direction of travel G), and a position in which they are oriented in an opposing lateral position (transverse orientation to the right) of the load-carrying arms 43.

All the operating functions associated with the mast 8 and the load-carrying assembly 36 can be carried out by means of a hydraulic apparatus (not shown).

FIG. 2 is a highly schematic view of the structure of a system for reducing vibrations, as used in the industrial truck from FIG. 1. In this figure, the reference sign 100 denotes a detection apparatus for detecting operating parameters of the industrial truck and parameters of the environment around the industrial truck.

The detection apparatus 100 in turn comprises a plurality of sub-systems or sensors that are each designed to detect a single operating parameter or one aspect of the environment around the industrial truck. In particular, the individual sub-systems 102 to 106 include an optical or ultrasound camera for recording the environment around the industrial truck, in particular for recording the travel surface 4 in front of the industrial truck 1 in the main direction of travel G, a position-determination system, for example a GPS receiver or a receiver for bearing signals emitted by transponders in a warehouse, and an apparatus for determining the load that is currently on the load-carrying group 36, and the position thereof. The individual sub-systems 102 to 106 of the detection apparatus 100 each transmit the data describing the parameters detected thereby to the prediction unit 110 in suitable formats.

This prediction unit 110 is designed to predict, on the basis of the data provided by the detection apparatus 100, events that may cause undesired vibrations to occur in the industrial truck 1 or at least one component thereof. These may for example be uneven areas in the travel surface 4 in the straight-ahead direction of travel G in front of the industrial truck 1 which the prediction unit 110 determines will be driven over by the one of the wheels 2 of the industrial truck 1. In order for it to be possible to make this prediction calculation, the detection apparatus can draw on data that are available in a first memory region 112a of the memory apparatus 112 and may contain, for example, historical data on the presence of uneven areas in the travel surface in specific positions and also permanently stored data that are necessary for correctly predicting the amplified vibration in the industrial truck, such as parameters of physical models and design data for the industrial truck 1. The prediction unit 110 itself in turn generates, on the basis of the data provided by the detection apparatus 100, prediction data which represent the expected vibrations, and for example indicate the expected time, direction and amplitude of the vibration. The prediction unit 110 provides these prediction data to the control unit 114.

This control unit 114 may also draw on the memory unit 112, with a second memory region 112b being associated therewith in the memory unit 112. The prediction unit 110 and the control unit 114 may be formed by a single data-processing device, such as an on-board computer of the industrial truck, as indicated in FIG. 2 by the dashed line having reference sign 116. The memory apparatus 112 may also be part of this on-board computer 116.

The control device 114 is designed to control operating components 118 of the industrial truck by control commands being output to suitable active components, such as control valves or a hydraulic system. The operating components denoted in FIG. 2 by reference sign 118 for example include the lifting function of the mast 8, the lateral pusher 38 and the additional mast 40 of the industrial truck 1 from FIG. 1.

On the basis of the data provided by the prediction unit 110 regarding expected vibrations in the industrial truck, the control unit 114 can adapt the actuation of the operating components 118 of the industrial truck, using characteristic diagrams stored in the second memory portion 112b, such that the predicted vibrations are proactively reduced as soon as the vibration-causing event occurs. For example, for expected transverse vibration of the mast 8 perpendicularly to the main direction of movement G, caused by the truck passing over an uneven area of the travel surface 4, the lateral pusher 38 can counteract this vibration at precisely the moment that it occurs, such that the spread of the vibration through the industrial truck 1 is prevented or at least suppressed.

Furthermore, the industrial truck according to the invention also comprises an apparatus 120 for reducing vibrations that, by contrast with the operating components 118, does not carry out any operating function of the industrial truck per se, but instead is merely intended to reduce the vibrations. This may be an apparatus in which the cantilever arrangement 24 from FIG. 1 is split into a first cantilever portion and a second cantilever portion, the first cantilever portion being a first part of the cantilever structure 9 such that it is vertically movable on the mast 8 together with the cantilever structure 9 but does not have a degree of freedom relative to the mast 8 horizontally transversely to the main direction of travel G of the industrial truck, whereas the second cantilever portion is arranged on the first cantilever portion so as to be movable by means of a drive arrangement such that the second cantilever portion together with the load-carrying assembly 36 fastened thereto can carry out vibration-compensation movements relative to the first cantilever portion and thus relative to the mast 8.

Here, on the basis of the prediction data provided by the prediction unit 110 and other design data for the industrial truck read out from the second memory portion 112b, the control unit 114 can likewise actuate the apparatus 120 for reducing vibrations such that as soon as the vibration-causing event occurs, it is counteracted by a suitable relative movement of the first and second cantilever portions.

The system from FIG. 2 further comprises an apparatus 122 for detecting vibrations which is operationally coupled both to the control unit and to the prediction unit. This apparatus 122 for detecting vibrations may for example be a three-dimensional acceleration sensor, which is arranged in a suitable position on the industrial truck, such as a position on the mast, the driver's platform or the load-receiving apparatus.

Providing this apparatus 122 for detecting vibrations makes it possible to provide feedback in the system shown in FIG. 2, for example by comparing a vibration predicted by the prediction unit 110 with the vibration subsequently detected by the apparatus 122 for detecting vibration and, if necessary, adapting parameters in the first memory region 112a that are used by the prediction unit 110 to predict vibrations. Similarly, the control unit 114 can benefit from data provided by the apparatus 122 for detecting vibrations, since it can be used to check, and if necessary adapt and improve, the outcome of the vibration-reducing adaptation carried out by the control unit 114 during operation of the operating components 118.

Furthermore, the system from FIG. 2 comprises a display apparatus 124 that is actuated by the control device 114 and can inform the user of the industrial truck of the fact that vibrations are likely to occur, for example by illuminating a warning light.

Lastly, the system according to the invention from FIG. 2 comprises a communication unit 126 which is in bidirectional data exchange both with the prediction unit 110 and with the control unit 114. By means of this communication unit 126, both the prediction unit 110 and the control unit 114 are capable of communicating with a superordinate system represented by the cloud symbol 128. Using this superordinate system 128, a plurality of industrial trucks that move together within a defined area, such as factory premises, can cooperate using the principle of swarm intelligence. For example, a first industrial truck can report the presence of an uneven area of ground in a particular position to the superordinate system 128 using its communication unit, such that the central entity is informed of the presence of this uneven area of ground. Other industrial trucks located at the same premises can then receive this information from the superordinate system 128 by means of their respective communication units 126, which in turn constitutes an input into their respective prediction units 110 which for example can also be stored in the first memory portion 112a for later use.

The invention claimed is:

1. An industrial truck, in particular a tri-lateral sideloader, comprising:
   a truck body;
   wheels connected to the truck body by wheel suspensions;
   a mast, which extends substantially vertically from the truck body and with which a plurality of attachment parts are associated;
   a plurality of operating components, which are designed to carry out operating functions of the industrial truck;
   a control unit, which is designed to actuate the plurality of operating components of the industrial truck; and
   a detection apparatus, which is designed to detect at least one of an operating parameter of the industrial truck or a parameter of an environment around the industrial truck;
   wherein the industrial truck further comprises a prediction unit, which is operationally coupled both to the detection apparatus and the control unit and is designed to predict an occurrence of vibrations on the industrial truck based on data provided by the detection apparatus which represent the at least one of the operating parameter of the industrial truck or the parameter of the environment around the industrial truck;
   wherein the industrial truck is designed to provide prediction data to the control unit; and wherein the control unit is further designed, based on the prediction data, to actuate at least one of the plurality of operating components to reduce vibrations associated with the truck body or the mast such that the vibrations predicted by the prediction unit are reduced.

2. The industrial truck according to claim 1, wherein the detection apparatus comprises at least one camera arranged and designed to detect a surface over which the wheels of the industrial truck will travel,
   wherein the prediction unit is further designed to predict the occurrence of vibrations at an area of the detected surface, based on pattern recognition of the detected surface.

3. The industrial truck according to claim 1, wherein the detection apparatus comprises at least one position-determination element.

4. The industrial truck according to claim 1, wherein the detection apparatus is designed to detect at least one of a weight or a current position of a load supported by the industrial truck.

5. The industrial truck according to claim 1, further comprising an apparatus for detecting vibrations which is operationally coupled to at least one of the control unit or the prediction unit,
   wherein the control unit is further designed to adapt an actuation of the at least one of the plurality of operating components based on a comparison of a predicted vibration to a detected vibration detected by the apparatus for detecting vibrations.

6. The industrial truck according to claim 5, wherein at least one memory unit is associated with at least one of the prediction unit, the control unit or the apparatus for detecting vibrations.

7. The industrial truck according to claim 1, further comprising at least one operating component of the plurality of operating components, wherein the control unit actuates the at least one operating component to reduce predicted vibrations, and wherein the at least one operating component is formed by a component of the industrial truck which is associated with at least one of a driver's platform of the industrial truck or with a load-receiving apparatus of the industrial truck.

8. The industrial truck according to claim 1, wherein the prediction unit and the control unit are formed by a single component.

9. The industrial truck according to claim 1, further comprising a communication unit, wherein the communication unit is designed to receive the parameter of the environment around the industrial truck from a central control device and to provide data to the central control device, wherein the central control device is configured to communicate with at least one additional industrial truck.

10. A method for reducing vibrations on an industrial truck, in particular a tri-lateral sideloader, wherein the industrial truck comprises:
    a truck body;
    wheels connected to the truck body by wheel suspensions;
    a mast, which extends substantially vertically from the truck body and with which a plurality of attachment parts are associated;
    a plurality of operating components, which are designed to carry out operating functions of the industrial truck;
    a control unit, which is designed to actuate the plurality of operating components of the industrial truck;
    a detection apparatus; and
    a prediction unit, which is operationally coupled both to the detection apparatus and to the control unit; and
    wherein the method comprises:

detecting at least one of an operating parameter of the industrial truck or a parameter of an environment around the industrial truck by means of the detection apparatus;

predicting an occurrence of vibrations on the industrial truck based on data provided by the detection apparatus which represent the at least one of the operating parameter of the industrial truck or the parameter of the environment around the industrial truck, by means of the prediction unit;

providing prediction data generated by the prediction unit to the control unit; and actuating at least one of the plurality of operating components to reduce vibrations associated with at least one of the truck body or the mast based on the prediction data such that the vibrations predicted by the prediction unit are reduced.

11. The method according to claim 10, wherein predicting the occurrence of vibrations includes predicting an event with reference to at least one of a detected current position or a detected current movement state of the industrial truck.

12. The method according to claim 10, further comprising exploring the environment around the industrial truck by detecting the occurrence of vibrations based on at least one of a position of the industrial truck, a movement state of the industrial truck, or other operating parameters.

* * * * *